US005557529A

United States Patent [19]

Warn et al.

[11] Patent Number: 5,557,529

[45] Date of Patent: Sep. 17, 1996

[54] IN-DISPENSER-CARD-READER CONTROL SYSTEM

[75] Inventors: Walter E. Warn, Knightdale; Fred K. Carr, Chapel Hill, both of N.C.

[73] Assignee: Progressive International Electronic, Raleigh, N.C.

[21] Appl. No.: 368,904

[22] Filed: Jan. 5, 1995

[51] Int. Cl.[6] .............................. G06F 17/00; G06K 5/00

[52] U.S. Cl. .............................. 364/479.02; 235/380

[58] Field of Search .............................. 364/479, 131, 364/465, 510, 401; 222/4, 53; 235/380, 381

[56] References Cited

U.S. PATENT DOCUMENTS 5,208,742 5/1993 Warn .............................. 364/131
5,270,943 12/1993 Warn .............................. 364/479
5,299,135 3/1994 Lieto et al. .............................. 364/479
5,361,216 11/1994 Warn et al. .............................. 364/510
5,394,336 2/1995 Warn et al. .............................. 364/479
5,423,457 6/1995 Nicholas et al. .............................. 222/62

*Primary Examiner*—Paul Gordon
*Attorney, Agent, or Firm*—Fred K. Carr

[57] ABSTRACT

The present invention relates to a fuel dispenser control system which controls the fuel dispensing process and accepts payment for the fuel dispensed through a card reader. The dispenser controller has a microprocessor with read-only-memory (ROM) and read-and-write-memory (RAM). A series of commands are stored in the ROM for controlling the dispensing process and accepting payment for the fuel dispensed. Configuration circuits' translate the communication language of the dispenser controller into a communication protocol readable by the dispensers such that the dispensing process of various dispenser brands can be controlled and payment for the fuel accepted. Response data from the dispenser is stored in the RAM, and then passed up a register system.

4 Claims, 5 Drawing Sheets

10

IN-DISPENSER-CARD-READER CONTROL SYSTEM

RELATED PATENTS

U.S. Pat. No. 5,270,943 entitled "Fuel Pump Control Card" filed Jan. 3, 1992 in the name of Walter E. Warn.

FIELD OF THE INVENTION

The present invention relates to a device and method for controlling fuel dispensers, and more particularly, to a fuel pump control system for controlling dispensers equipped with in-pump-card-readers.

BACKGROUND OF THE INVENTION

Self service fueling sites are widely used to provide fuel for the traveling public. These sites most often have specialized fuel dispensing systems where the dispensers are controlled by a remote dispenser controller located in the building where other items are available for sale. The controller has electrical connections to the dispensers for transferring data signals for monitoring and controlling the dispensing operation. In general, the dispenser controller is a microprocessor with read-only-memory (ROM), read-and-write memory (RAM), and input/output ports for reading and storing information. The controller sends data signals to the dispensers, and the dispensers send data signals to the controller. Data signals sent to the dispenser from the controller include price per gallon to be charged at corresponding pumps, preset limits of fuel to be pumped at corresponding pumps, and pump authorization. Data signals sent from the dispensers to the controller include pump number, pump status, and dispensed fuel volume and value.

Many newer dispenser models include a card reader system for reading credit and debit cards, and a cash acceptor for accepting dollar bills. These systems provide a method by which customers can pay for the fuel dispensed at the dispenser by a charge/debit card or by cash if they desire. The system generally includes a card reader, a cash acceptor, input keys for selecting the type payment desired, a display for prompting the customers, and a printer for printing a receipt of the fuel dispensed. These systems may be manufactured as part of the dispenser, or mounted on a dispenser in retrofit situations.

There are several commercial brands of dispensers used in the petroleum retail industry manufactured by different manufacturers. Each dispenser brand has its own unique communication protocol for communication between the dispenser and controller. Certain dispenser manufacturers use current loop communication, others use voltage level communication. A fuel dispenser with a card reader/cash acceptor performs two functions: it dispenses fuel and it accepts payment for the fuel dispensed. U.S. Pat. No. 5,270,943 entitled Fuel Pump Control Card having a common inventor and assignee discloses and claims a dispenser control system for controlling different dispenser brands through a pump control card interfaced to a point-of-sales (POS) system. The present invention improves on that disclosure by accepting payment for the dispensed fuel as well as controlling the dispensing function.

SUMMARY OF THE INVENTION

In summary, the present invention relates to a fuel dispenser control system which controls the fuel dispensing process and accepts payment for the fuel dispensed through a credit card reader. The dispenser control system uses a microprocessor with read-only-memory (ROM) and read-and-write-memory (RAM) where a series of commands are stored in the ROM for controlling the dispensers and for accepting payment for the fuel dispensed. Configuration circuits translate the communication language of the dispenser control system into a communication protocol readable by the dispensers such that the dispensing process of various dispenser brands can be controlled and payment for the fuel accepted. Response data from the dispenser during the fueling process is stored in the RAM, and then passed up to the POS system. The flow of data between the microprocessor in the dispenser controller and the microprocessor in the POS system is controlled by a terminate-stay-resident driver. The driver allows the POS application software program to integrate pump control with card authorization, credit/cash card payment, and cash payment at the dispenser.

Accordingly, the primary object of this invention is to provide a fuel dispenser control system for controlling fuel dispensers with card reader/cash acceptor through a POS system.

A further object of the present invention is to provide a dispenser control system which can control dispensers with card readers/cash acceptors made by different manufacturers.

A further object of this invention is to provide a fuel pump control system which will accept a credit card for payment of the fuel dispensed.

A further object of the present invention is to provide a fuel pump control system which will accept cash for payment of the fuel dispensed.

BRIEF DESCRIPTION OF THE DRAWINGS

Other objects of this invention will appear in the following specification and claims, reference being made to the accompanying drawings which form a part thereof.

DETAILED DESCRIPTION OF THE INVENTION

Figure 1:
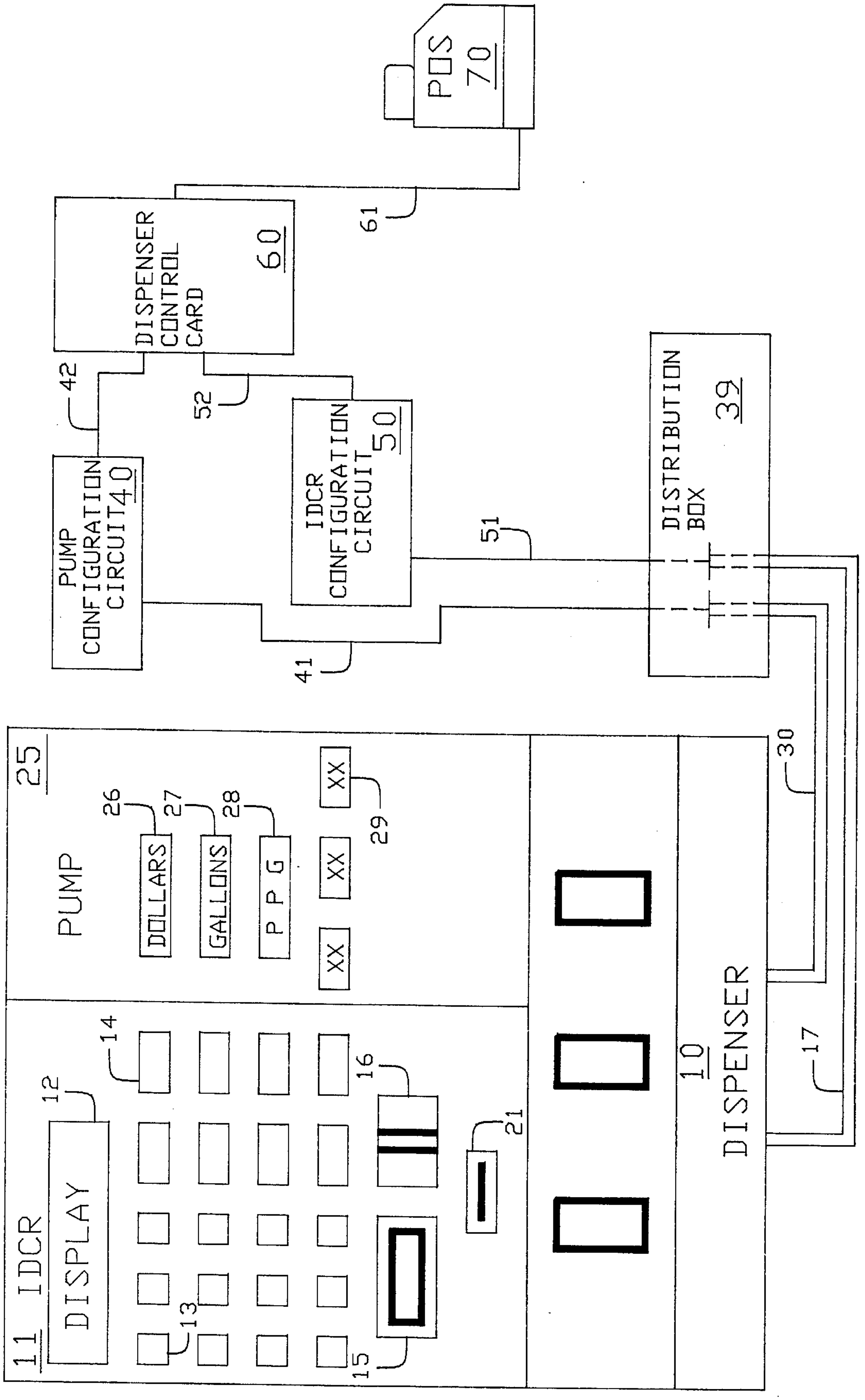
FIG. 1 is a schematic diagram of a fuel dispensing facility having a dispenser with card reader and cash acceptor functionally connected to a POS terminal.

Referring now to the drawings, and first to FIG. 1, there is shown a schematic overview of a fuel dispensing system including a fuel dispenser with card reader/cash acceptor, generally designated (10), connected to a POS system (70) through the dispenser control board (60) and configurators (40,50). The POS (70) monitors the dispensing process at the dispenser (10) and accepts payment for fuel dispensed at the dispenser through the dispenser control board (60) which transfers data signals to and from the dispensers through data wires. The configurators (40,50) configure the logic signals from the dispenser control board (60) into a protocol format readable by the dispenser (10). For this discussion, an example of one dispenser is used. In the industry, however, it is common for a facility to have several dispensers at a fueling site. It is understood that one dispenser is used only for illustration, and further that the dispensers may be single product, dual product, or multi-product dispensers.

A dispenser with a card reader/cash acceptor performs two functions: it controls the dispensing function and it can accept payment for the fuel dispensed. The dispenser (10) can, therefore, be discussed as having a pump control component, generally designated (25), which generally controls the dispensing function, and an in-dispenser-card-reader (IDCR) component, generally designated (11), which accepts payment for the fuel dispensed. The pump side (25) includes a dollar display (26) for displaying the amount of fuel dispensed, a gallons display (27) for displaying gallons dispensed, and a price per gallon display (28) for displaying the price of the fuel being dispensed. Displays (29) display the price of other fuel grades available from the dispenser.

The IDCR side (11) of the dispenser generally includes a display (12) for prompting the customer, numeric input key switches (13) for entering information such as personal identification numbers, selection key switches (14) for selecting the desired method of payment, a cash acceptor (15) for accepting bills, a credit/debit card reader for reading cards, and a printer (21) for printing a receipt of fuel dispensed.

In the illustration, communication data wire pairs (17,30) run from the pump distribution box (39) to the dispenser (10) and back to the distribution box (39). A distribution box is a wire connection box where all wires in a communication network have a common connection. This illustration shows a wiring example where the dispensers-controller are communicating in current loop communication. Data wire pair (30) controls the pump side (25) and data wire pair (17) controls the IDCR side (11). The dispenser control board (60) sends data signals (commands) to the dispenser (10) for controlling the dispensing process, and the dispensers send data signals (responses) to the control board. The dispenser control board (60) also sends command signals to the IDCR (25) and the IDCR sends responses to the control board (60). Information send to the dispenser (10) includes price per gallon to be charged for the fuel at corresponding pumps, preset limits for fuel to be dispensed, and pump authorization. Simultaneously, signals are being generated at the dispenser (10) for presentation to the control board (60) including pump number, pump status, and dispensed fuel volume and value for the pump.

Dispenser manufacturers use different wiring arrangements and a unique communication protocol for communication between their dispensers and controller. A wiring example for current loop communication is shown in FIG. 1. Another type communication used in the industry is voltage level. As later discussed, the present invention can control various dispenser brands by using configuration circuits (40,50) to translate command and response signals between the dispenser (10) and the dispenser control board (60).

During a fueling transaction, a customer pulls his vehicle along side the dispenser (10). The customer removes the nozzle (not shown) and inserts it in his fuel tank. The customer then selects the method of payment by which he wishes to pay for the fuel by pushing one of the input selection keys (14). Generally, there is an input key for: credit at the dispenser, credit inside, cash at the dispenser, and cash inside. There is also a cancel key, and an enter key. If other information such as a personal identification number is requested, this is entered into numeric key pad (13).

If the customer selects credit at the dispenser, he inserts his credit or debit card into card reader (16). The card number is read in a conventional way, stored in a queue, and then passed to the POS (70). The card number is checked for validation, and the dispenser thereafter authorized to dispense fuel. When cash at the dispenser is selected, the appropriate bill is inserted in the cash acceptor (15), and that amount of fuel is dispensed. If a receipt is requested, the appropriated input key is pressed and a receipt is printed by printer (21).

When credit inside or cash inside is selected, the attendant in the store receives a signal that a customer wants this service. The attendant authorizes the pump by pushing a key on the POS input terminal. As the fuel is dispensed, response data fields are generated and sent to the dispenser control board (60). When the customer is finished and places the nozzle back on the dispenser, the volume or value of the fuel dispensed is displayed on the POS screen (70).

Cables (41,51) connect the respective configuration circuits (40,50) into the distribution box (39), and cables (42,52) connect the respective configuration circuits to the dispenser control circuit (60). Serial cable (61) connects the dispenser control board (60) to the POS (70).

Figure 2:
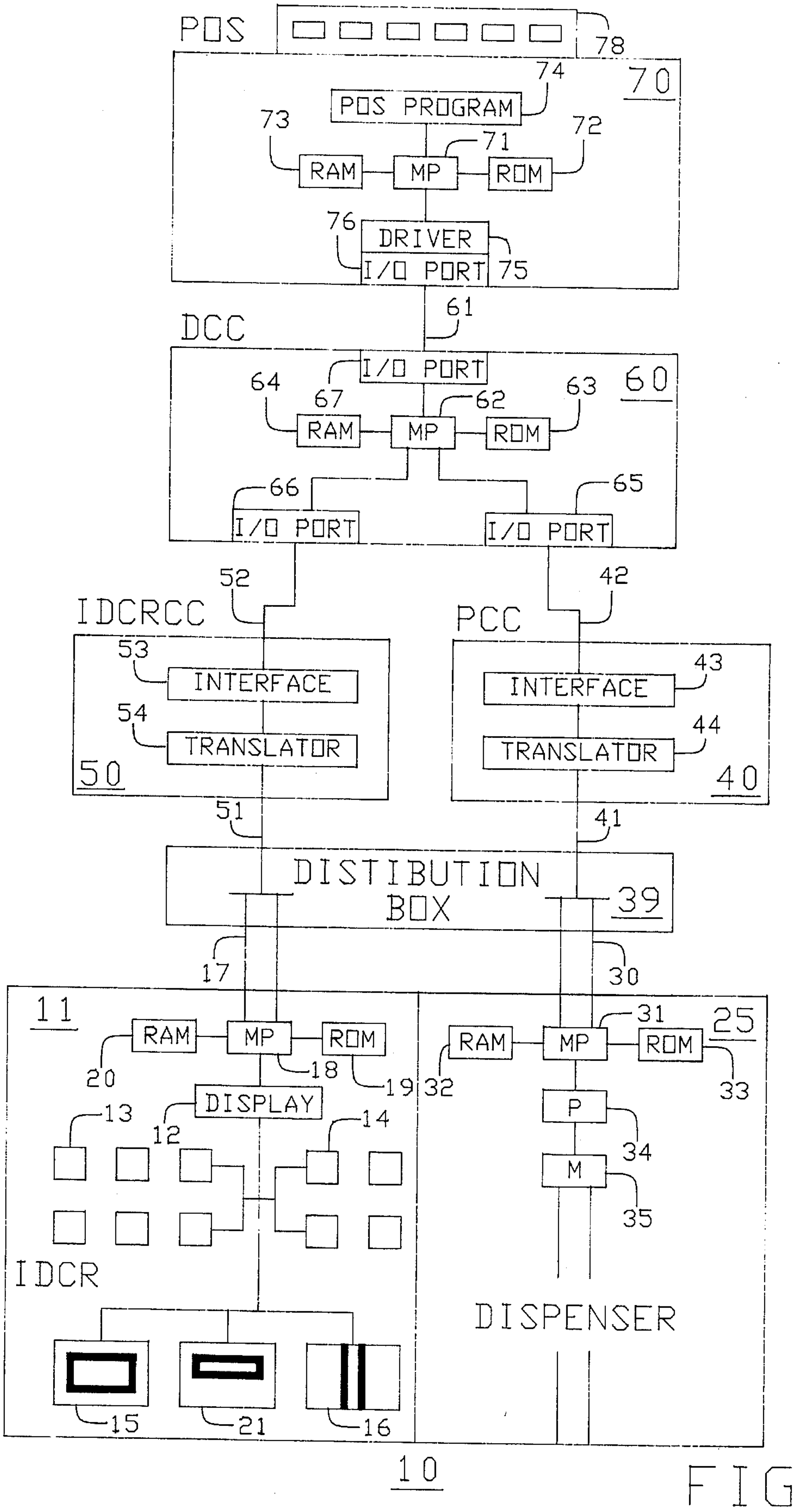
FIG. 2 is a block diagram of the functional components of the invention showing connection of the dispenser to the configurator circuits, dispenser control card, and the POS.

Referring now to FIG. 2, there is shown a schematic block diagram of the fuel dispensing system including the dispenser (10), the distribution box (39), the pump configurator (40) and the IDCR configurator (50), the fuel pump control board (60), and the POS (70). The use of POS system to control fuel dispensers is now being more widely used in the industry replacing the older method of dispenser control through a console, which is a separate device from the register. These systems utilize a hardware platform with POS application programming to integrate features including cash register function, dispenser control, and credit card authorization. Generally, these systems include a cash register, or POS system, application software program interfaced to auxiliary software programs (modules) for the above functions. The present invention provides a method for controlling different fuel dispenser brands with a register having the same application software program. The POS system (70) includes a processing unit (71) with read-only-memory ROM (72) and read-and-write memory RAM (73), which in combination with the register application software constitute a POS means. The flow of data between the register (70) and the dispenser control board (60) is through I/O ports (76,67) which is controlled by a driver (75), later discussed. Other information can be keyed into the POS (70) through input board (78).

The dispenser control board (60) includes a microprocessor (62), Zylog Z80 being an example, with associated software programs for processing the pump control and IDCR commands, receiving and storing the response from the pump (25) and IDCR (11). The system includes a read-only-memory chip, ROM (63), for storing the pump control and IDCR commands, and a read-and-write memory chip, RAM (64), for storing variables such as prices to charge for the fuel at the dispensers, totals dispensed by the dispensers, card numbers, and other response data from the dispensers during the dispensing process. These chips have conventional bus connections with the MP (62). Microprocessor (62), ROM (63), RAM (64), with later discussed programming constitute a dispenser control means.

A feature of the dispenser control system (60) is that it has the ability to control several dispenser brands, each of which have their own unique communication protocol. This is accomplished by configuration circuits (40,50) which are, in essence, language translators. Electronic dispensers with in pump card reading capability have an electronic computer with memory devices for controlling the dispensing process and another processing device in the IPCR for controlling the card reading function, later seen. Certain dispenser brands use current loop communication, others use voltage level communication, still others use a mixture thereof. The configuration circuits (40,50) are, in effect, a circuits for translating communication protocols, thereby providing a method for controlling the pumps in accordance with dispenser protocol. For example, with dispensers using current level communication, it is a current translator; with dispensers using voltage level communication, it is a voltage translator.

There is shown in FIG. 2 a block diagram of the dispenser configuration circuit (40) which includes an interface circuit (43) for receiving computer logic signals from the MP (63) in the dispenser controller (60) and a translator circuit (44) for configuring the computer logic signals into digital data signals for controlling the dispenser (10) and configuring the responses from the dispenser into computer logic signals. If the dispenser (10) and the dispenser controller (60) are communicating in current level, the translator (44) includes an opto-coupler with light emitting diode and transistor, commercially available. If the dispenser and controller are communicating in voltage level, the translator (44) includes a comparator (for example LM 393) for configuring the computer logic signals into digital data signals. There is a baud rate chip (not shown) for synchronizing input/output to the MP (60) in the controller (60). The configuration circuit (40) includes a power supply for converting AC to DC including a low voltage regulator providing a constant current or voltage. For example, in a current loop system it provides a constant 45 milliamps. The systems interface circuit (43), the translator circuit (44), and the power supply constitute a dispenser configuration means.

Configuration circuits (40,50) are connected to the dispenser control system (60) through cables (42,52), and have a baud rate chip for synchronizing input/output to the MP (62). In the illustration, configuration circuits are shown as a separate components, however, it is understood that the configuration circuits could be included as an integral part of the dispenser control board (60).

The configuration circuits (40,50) are connected to the pump data wire (30) in the distribution box (39) through data cable (41), and to the in-dispenser-card-reader (11) through data cable (51). The distribution box is generally a common box in which all wiring to and from the pumps have a common connection. Generally on the pump side (25), electronic fuel dispensers have a microprocessor (31) with ROM (33) and RAM (32) for controlling the pumps, valves, flow quantity generators, and related, used during the dispensing operation. The fuel is pumped from a fuel storage tank, not shown, through a metering device (35) into the vehicle. The metering device measures the amount of fuel being dispensed, and is associated with a pulser (34) which sends a pulse signal to the MP (31) indicating the amount of flow. The MP (31), the ROM (33), the RAM (32), the pulser (34), and the meter (35) constitute a pump means.

On the card reader side (11) of the dispenser (10), there is another MP (18) with ROM (19) and RAM (20) for controlling the card reading function. These in addition with the display (12), numeric input keys (13), customer selection keys (14), card reader (16), cash acceptor (15), and printer (21) constitute an in-dispenser-card-reader means. A fuel dispensing means includes the pump means and the in-dispenser-card-reader means.

Following is an illustrative example of the communication protocol used in the credit card interface for controlling fuel island card readers. Each reader is activated by sending a keyboard layout, and each reader is sent a printer header and footer message. Commands are passed to and from the reader in "queues." Each queue entry contains enough information to complete the command and is processed in chronological order. The commands are stored in ROM (63) of the dispenser control circuit (60) and include: keyboard configure command, reader status command, key queue control, card queue control, cash queue control, print queue control, display queue control, and key entry control.

In a preferred embodiment of the present invention, the above credit card reader interface commands are used in combination ten commands used to control the pumps during the fueling process. These commands are likewise stored in the ROM (63), and include: pump authorization, sale information, pump stop, pump resume, error, status request, reset, pump totals, blend, and price per unit. The communication protocol for controlling the pump side of a dispenser was disclosed and claimed in U.S. Pat. No. 5,270,943, which is incorporated as an essential reference in this application. Commands are initiated through input keys on the transaction board (78) on the POS (70).

The protocol uses a "2's" compliment check byte. Each command and response data is transferred in a formatted frame starting with a "start of text" (ASCII STX [02]), followed by the command and data or response, followed by the "end of text" (ASCII ETX [03]) and the check byte. All data (except the check byte) are ASCII characters. All commands are one character, the pump number is two characters, the hose number is one character. All commands are "ACKed" (ASCII 06) or "NAKed" (ASCII 15/16), but the responses are not.

Command format:
STX CMD HH [ ... Data ... ] ETX CD
STX = ASCII 02/16
CMD = command code (one character)
HH = Reader Number
Data = programming data or action
ETX = ASCII 03/16
CD = check digit The KEYBOARD CONFIGURE COMMAND 'Z' configures the input selection keys in the IDCR and is as follows:

Command Format:
STX Z HH ABCD000000000RSTUVeETX[cd]
HH = Reader number (2ASCII ETX [cd]
0 = NULL
e = End of String code
Special Keys
S = Start code
E = Enter code
L = Clear code
B = Backspace code
C = Cancel code
Response:
ACK / NAK only The READER STATUS COMMAND 'Y' determines the status of the card reader and is as follows:

Command format:
STX Y Flag ETX [cd]

-continued

```
Response:
    STX S1 S2 S3
    RRRRRRRRRRRRRRRRRRRRRRRRRRRR ETX[cd]
        S1 =    bit 7 - don't care
                bit 6 - 1
                bit 5 - reserved
                bit 4 - reserved
                bit 3 - CASH QUENE FULL
                bit 2 - CASH QUENE EMPTY
                bit 1 - CARD QUEUE FULL
                bit 0 - CARD QUEUE EMPTY
        S2 =    bit 7 - don't care
                bit 6 - 1
                bit 5 - KEY CONFIG QUEUE FULL
                bit 4 - KEY CONFIG QUEUE EMPTY
                bit 3 - KEY QUEUE FULL
                bit 2 - KEY QUEUE EMPTY
                bit 1 - DISPLAY QUEUE FULL
                bit 0 - DISPLAY QUEUE EMPTY
        S3 =    bit 7 - don't care
                bit 6 - 1
                bit 5 - reserved
                bit 4 - reserved
                bit 3 - reserved
                bit 2 - PRINT ENTRY ACTIVE
                bit 1 - PRINT QUEUE FULL
                bit 0 - PRINT QUEUE EMPTY
        R =     reader dependent status
                bit 7 - don't care
                bit 6 - 1
                bit 5 - PRINTER PAPER OUT
                bit 4 - PRINTER PAPER LOW
                bit 3 - PRINTER IDLE
                bit 2 - ECHO ON
                bit 1 - NUMERIC ENTRY ONLY
                bit 0 - READER LOGGED
```

The KEY QUEUE CONTROL 'X' reads or clears the top entry in the key queue and the command is as follows:

```
READ
    Command format:
        STX X R ETX[cd]
    Response:
        STX HH kk ... [NULL]ETX[cd]
            HH=    Reader number (2 ASCII digits)
            k=     Returned key code
CLEAR
    Command Format:
        STX W C ETD[cd]
    Response:
        ACK/NAK ONLY
```

The CARD QUEUE CONTROL 'W' reads or clears the top entry in the card queue and the command is as follows.

```
Read
    Command
        STX W R ETX[cd]
    Response
        STX HH track 1 [NULL] track 2 [NULL] ETX[cd]
            HH= Reader number (2 ASCII digits)
            track 1= Track 1 data
            track 2= Track 2 data
Clear
    Command
        STX W C ETD[cd]
    Response
        ACK/NAK only
```

The CASH QUEUE CONTROL 'V' reads or clears the top of the cash queue and is as follows.

```
Read
    Command
        STX V R ETX[cd]
    Response
        STX HH $$$$.$$ ETX[cd]
            HH= Reader number (2ASCII digits)
            $$= Cash amount (decimal implied)
Clear
    Command
        STX V C ETX[cd]
    Response
        ACK/NAK only
```

The PRINT QUEUE CONTROL 'U' sends a print job to the printer through a queue. Each print job is tagged with the reader number and message type.

```
Print Job Types
    H= Header
    F= Footer
    R= Receipt
String Flags
    OO= First data string
    nn= Subsequent data strings
    FF= Ending string
Data Strings
    Command
        STX U nn'ss..ss'[NULL] dd ETX[cd]
            nn= String number (2ASCII decimal digits)
            ss= Print data
            dd= Next string number (2ASCII digits)
    Response
        ACK/NAK only
Ending String
    Command
        STX U FF hh t ETX[cd]
            FF= Ending flag (2ASCII 'F' characters)
            hh= Reader number (2ASCII) digits
            t= Print job type
    Response
        ACK/NAK only
```

The DISPLAY QUEUE CONTROL 'T' sends data to the display.

```
Command
    STX T HH 'ss..ss;[NULL] ETX[cd]
        HH= Reader number (2ASCII digits)
        ss= Display data
Response
    ACK/NAK only
```

The KEY ENTRY CONTROL 'S' activates the keyboard and specifies the type keyboard input allowed. The entry can be any key, numeric with echo, or numeric without echo.

```
Command
    STX S HH n e ETX[cd]
Response
    ACK/NAK only
```

Figure 3:
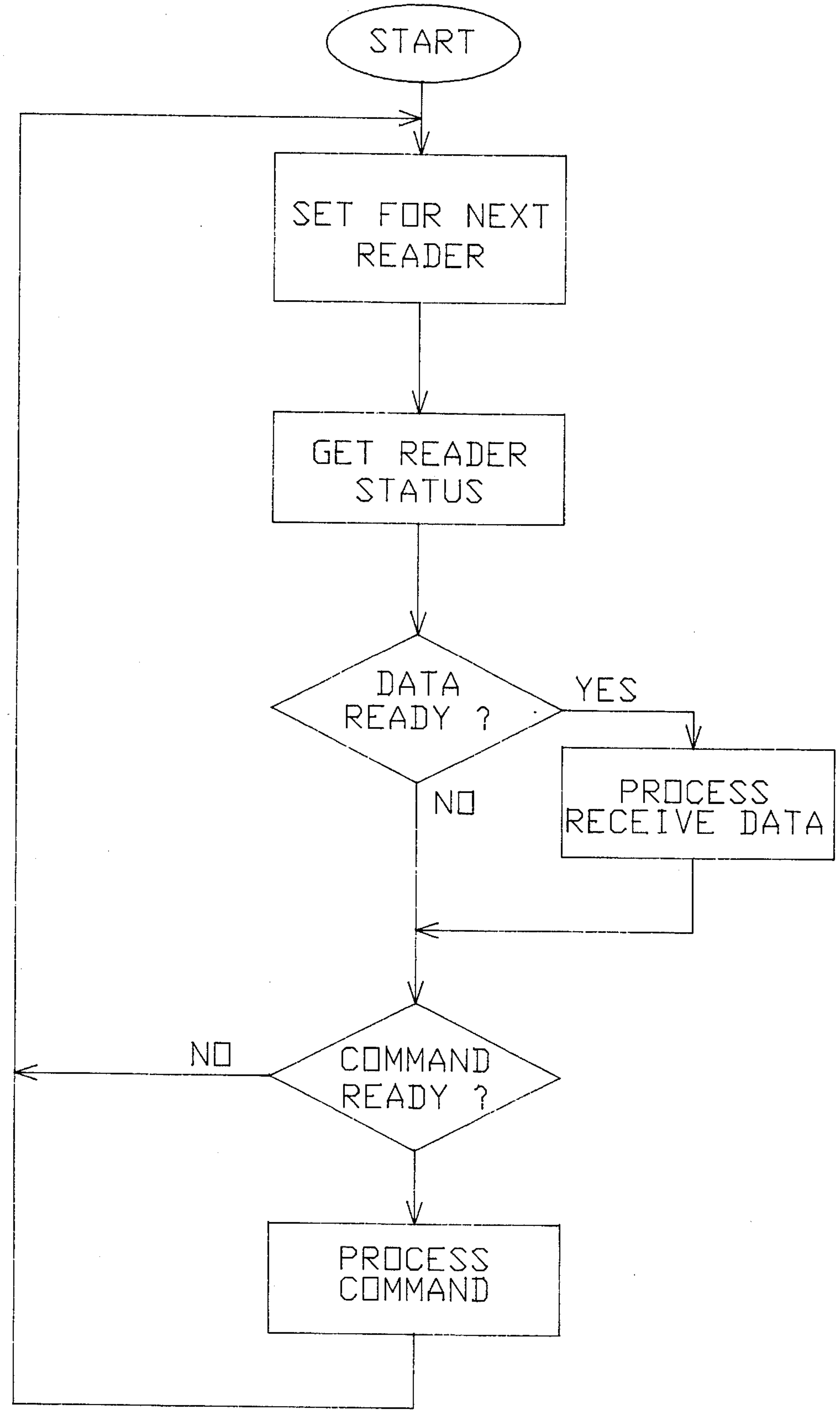
FIG. 3 is a flow chart illustrating the programming for reading the card reader and processing the receive data.

Referring now to FIG. 3, there is shown a flow chart for processing the card reader commands by MP (62) stored in the ROM (63). The dispenser is constantly polled by the MP (62) on the dispenser control board (60) to determine status in the pump side (25) and card reader side (11). A request for service at a dispenser is initiated by a customer pressing a selection key (14), where reader number and related information is stored in queue. When data is stored, the "data ready" decision block causes the receive data to be processed. When the command is ready, the command is processed through the command ready decision block.

Figure 4:
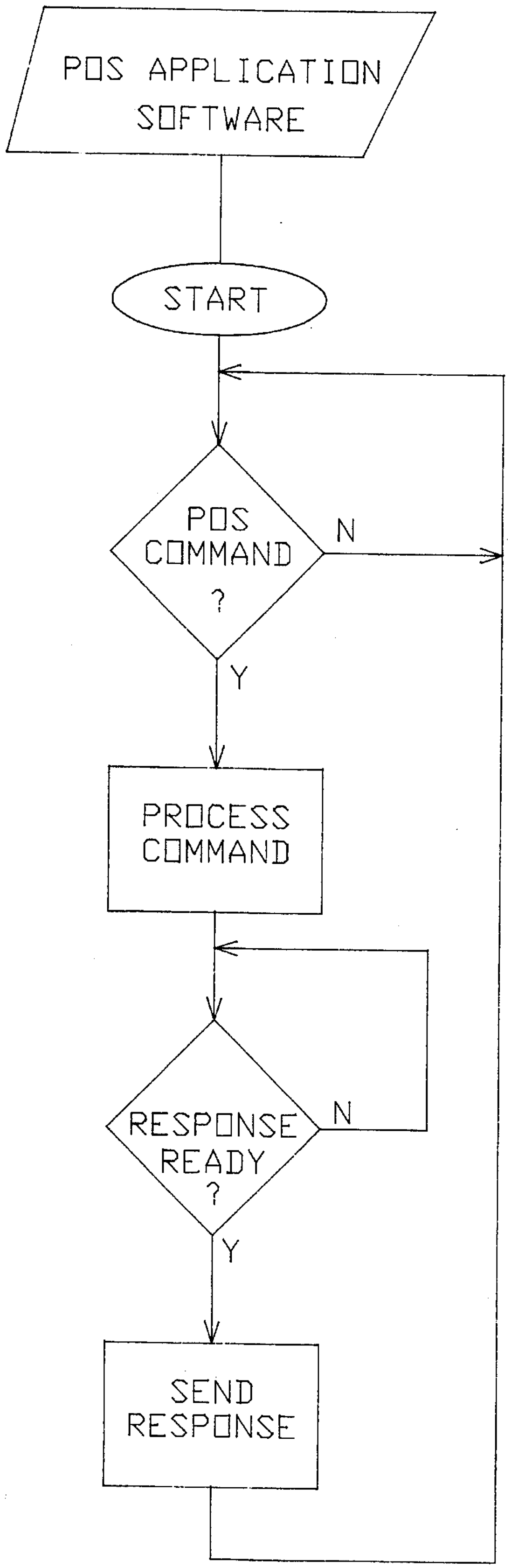
FIG. 4 is a flow chart illustrating the interface between the invention a the POS application software.

Referring now to FIG. 4, there is shown a block diagram illustrating the interface between the dispenser control system (60) and the POS application software. As previously discussed, a POS system can integrate several features as cash register function, credit card processing, etc., through auxiliary software programs. In the illustration, the driver for the dispenser control system (60) is a terminate-stay-resident (TSR) program. Data on the dispensing process and card reading process is stored and accessed through the RAM (64), and includes pump status, price per gallon of the fuel being dispensed, pump totals for fuel dispensed, as well as response data from the card reader (11).

Following is an example of a MS/DOS driver for the dispenser control system (60) and the POS (70). It is understood that the DOS driver is an illustrative example only, other operating systems can be used in the present invention. The driver is a TSR program for controlling the flow of data to and from the dispenser control system (60). The TSR is accessed through a DOS "interrupt" with the AH register containing the function number and the DS:DX segment register. The register contains the buffer address of the data to or from the driver. The TSR driver makes use of two DOS interrupts; one interrupt accesses the driver, the other interrupt links the "Timer-Tick" for time out operations.

The DRIVER STATUS Function 1(16) determines the driver status: a BUSY 1(16) status in the AL register indicates the last command posted is still in progress, a DONE 0(16) status in the AL indicates the last command posted is complete and any response is ready to read.

| | | |
|---|---|---|
| AH= | 0 | No error |
| | 1 | Time out |
| | 2 | Check sum error |
| | 3 | NAK error |

The PUMP STATUS function 2(16) returns the current system and pump status. When there is no command for the driver to process, it request the pump status and stores it in a buffer. Each status byte contains 8 bits of status according to the extended status definitions. The status is transferred to the buffer pointed to by DS:DX and requires 33 bytes.

The SEND COMMAND function 3(16) sends the buffer pointed to by DS:DX to the pump control system. The first byte of the buffer contains the number of bytes to transmit; the second byte contains the number of bytes to receive (0=no receive expected); the third byte is the beginning of the data. This function sets a busy signal; when the command is complete, a DONE status is returned by Function 1.

The READ DATA function 4(16) command returns the data received in response to the last command. The data is transferred to the buffer pointed to by DS:DX. The buffer must be large enough to hold the number of bytes requested in the RECEIVE COUNT (second byte) from the last SEND command. The AH register contains the error that occurred during the command operation (0=no error).

The VERSION function 10(16) returns the DOS driver version number, along with the type of DOS driver, the hardware interrupts number and the port address.

The DRIVER INITIALIZATION function 0(16) initiates the TRS interrupt operation and is used after the driver has been installed.

Figure 5:
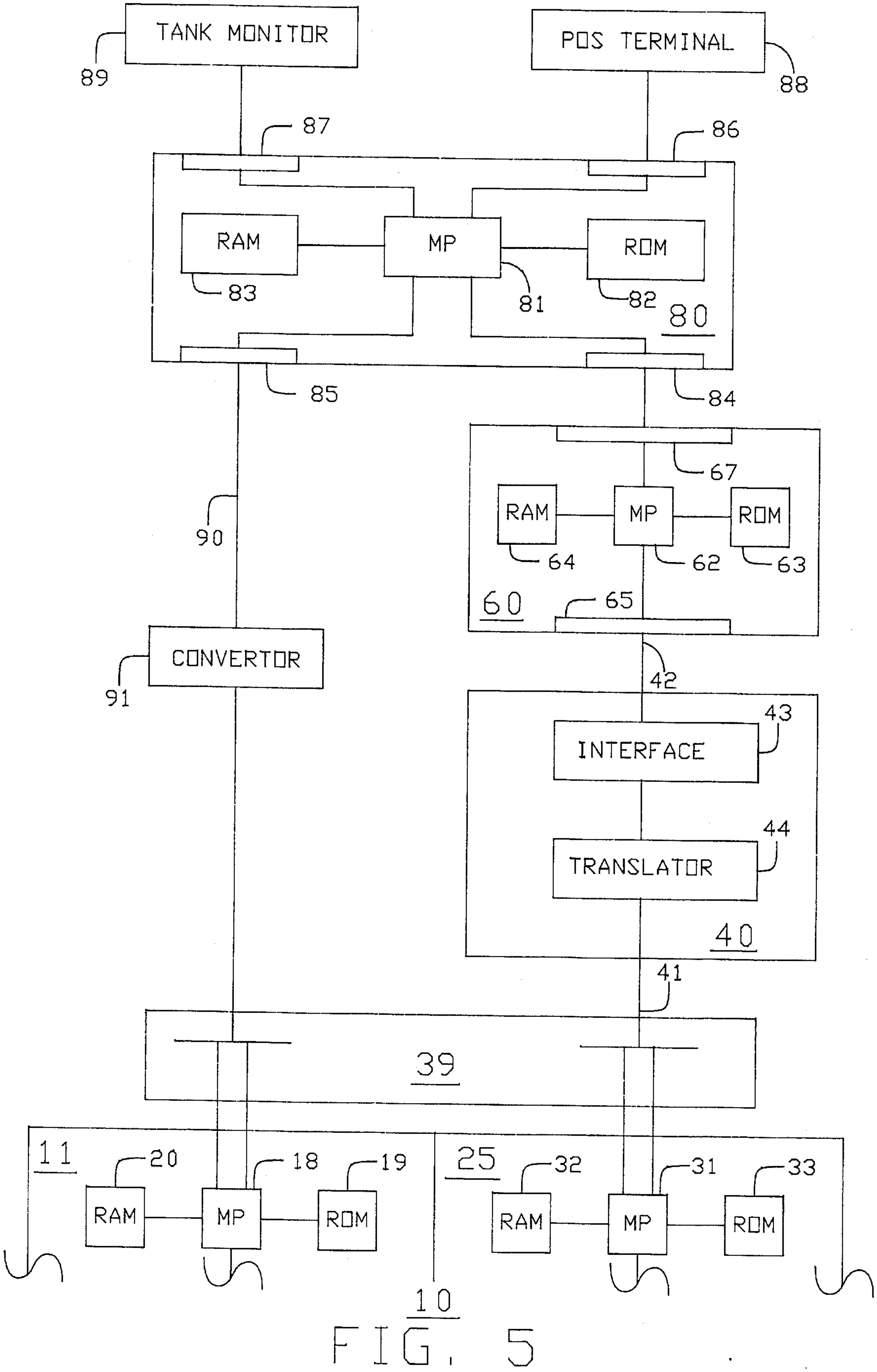
FIG. 5 is a block diagram illustrating a fueling site configuration where the dispensing function in the dispenser is controlled through a dispenser control board and the credit card reader is controlled through a site controller.

In the previously discussed preferred embodiment of the present invention, the commands/responses for controlling the pump side (25) and the card reader side (11) of dispenser (10) are processed by MP (62) in the dispenser control board (60). Referring now to FIG. 5, there is shown an alternate embodiment in which the commands/responses for controlling the pump side (25) are processed by MP (62) in the dispenser control system (60), and the commands/responses for the card reader side (11) are processed by a MP (81) in a site controller (80). In this embodiment, the MP (62) can be interfaced to MP (81) in the site controller (80) through the previously discussed driver.

Referring further to FIG. 5, there is shown a block diagram of a site controller, generally designated (80). Site controllers can be used to control several task at a fueling site including one or more POS terminals (88), tank monitoring devices (89), and others not shown, as well as card reader function (11). The site controller (80) has a MP (81) coupled to a ROM (82) and a RAM (83). MP (81) is connected to POS terminal (88) through I/O port (86), and to the tank monitoring system (89) through I/O port (87). MP (81) is connected to the card reader (11) through distribution box (39) by way of I/O port (85). There is a convertor (90) for transforming, for example, RS232 language into 485 language if needed.

In the alternate embodiment, the command structure disclosed in reference U.S. Pat. No. 5,270,943 is used to control the pump side (25) of dispenser (10) through the dispenser control system (60), where the commands/responses include the authorization command, the sale information command, the stop command, the resume command, the error command, the status request command, the reset command, the pump totals command, the price per unit command, and the blend command, and are stored in ROM (63). In this embodiment, the card reader side (11) of the dispenser (10) is controlled by MP (81) in the site controller (80) using the command structure disclosed and claimed in the present application as previously discussed, and are stored in ROM (82).

In the illustration, the dispenser control board (60) has a serial connection to MP (81) in the site controller through I/O port (84). Dispenser control board (60) could also have a parallel connection as a daughter board to the main board in MP (81) in site controller (80).

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A fuel delivery system, comprising:

(a) a fuel dispensing means having a pump means for delivering a variable volumetric flow of fuel into a vehicle tank and an in-dispenser-card-reader means for accepting payment for the fuel dispensed;

(b) a register means, functionally connected to said fuel dispensing means, for initiating commands to said fuel dispensing means and for receiving responses from said fuel dispensing means;

(c) a fuel dispenser control means having a programmable data processor with a read-only-memory device and a read-and-write-memory device, operatively connected between said fuel dispensing means and said register means, for:

(1) reading an input selection key in said in-dispenser-card-reader in said fuel dispensing means for determining when a customer wants service and how said customer wants to pay for fuel dispensed;

(2) retrieving commands from said read-only-memory device in a predetermined sequence and outputting said commands in a readable format to said pump means in said dispensing means causing fuel to be dispensed;

(3) receiving response data from said pump means and said in-dispenser-card-reader means in said fuel dispensing means during the fueling process and storing said response data in said read-and-write-memory device;

(4) retrieving said response data from said read-and-write memory device and down-loading to said register means on request;

(d) a first configuration means electrically connected between said fuel dispenser control means and said pump means in said fuel dispensing means for configuring said commands and responses into a communication protocol readable by said pump means and a second configuration means connected between said dispenser control means and said in-dispenser-card-reader means in said dispenser means for configuring said commands and responses into a communication protocol readable by said in-dispenser-card-reader means.

2. A fuel delivery system as defined in claim 1 wherein said first configuration means and said second configuration means include an opto-coupler with light emitting diode and transistor for translating current levels.

3. A fuel delivery system as defined in claim 1 wherein said first configuration means and said second configuration means include a comparator for translating voltage levels.

4. A dispenser control system for controlling a fuel delivery system, used in combination with at least one fuel dispenser having a pump means with a first microprocessor with programmable memory device for dispensing fuel, an in-dispenser-card-reader means with a second microprocessor with programmable memory device for accepting payment for fuel dispensed, and a register means having a third microprocessor with programmable memory device having POS application programming for performing cash register operations, comprising:

(a) a fuel dispenser control means including a printed circuit board with a read-only-memory device for storing a series of commands to control said fuel dispenser during the fueling process and a read-and-write-memory device for storing responses from said dispenser during the fueling process, and a dispenser control processor, operatively connected to said first and second microprocessors in said dispenser and to said third microprocessor in said register means, for (1) reading said second microprocessor in said in-dispenser-card-reader to determine the presence of a customer at said dispenser and how said customer intends to pay for dispensed fuel;

(2) retrieving said commands from said read-only-memory device in a predetermined sequence and outputting said commands in a readable format to said first microprocessor in said dispenser causing said dispenser to dispense fuel;

(3) receiving response data from said first microprocessor during the fueling process and storing said response data in said read-and-write-memory device;

(4) processing and outputting said response data to said third microprocessor in said register means through a driver interface program to control the flow of data between the two;

(b) a first configuration means functionally connected between said dispenser control processor and said first microprocessor in said dispenser for translating the communication protocols of the two wherein said commands are readable by said first microprocessor and said responses are readable by said dispenser control processor, and a second configuration means functionally connected between said dispenser control processor and said second microprocessor in said dispenser for translating the communication protocols of the two wherein said commands are readable by said second microprocessor and said responses are readable by said dispenser control processor.

* * * * *